3,345,358
GEL-FORMING POLYSACCHARIDE DERIVATIVES
PREPARED BY CROSS ESTERIFICATION
Petrus Adam Inklaar, Diepenveen, Netherlands, assignor to Vasco Industries Corp., New York, N.Y., a corporation of New York
No Drawing. Filed Jan. 16, 1964, Ser. No. 338,011
Claims priority, application Germany, Jan. 23, 1963, V 23,550
20 Claims. (Cl. 260—233.5)

This invention relates to new derivatives of polysaccharides such as starch, amylose, amylopectin, or the like, which possess distinctive swelling and bodying properties in aqueous liquids, and to a method of preparing the new products.

It is known that readily water-soluble products are obtained by the conversion of such polysaccharides in finely divided state into the corresponding carboxymethyl ethers, such as by reacting them with monochloroacetic acid or sodium chloroacetate in an alkaline methanol medium. The resulting carboxymethyl ethers are recovered in the form of alkali metal salts, e.g., as Na-carboxymethyl starch or Na-carboxymethyl amylose. They form solutions having but a limited viscosity. For example, the viscosity of a 5% solution of any of them in water amounts at most to a few thousand centipoises.

According to the present invention, it has been discovered that products which display remarkable swelling powers in water and other aqueous liquids can be obtained by acidifying finely divided carboxymethyl ethers of polysaccharides such as those above mentioned, as by treating any of them with acid in a methanol or other water-miscible organic liquid medium of the nature useful in the manufacture of carboxymethyl starch, so that acid carboxymethyl groups (i.e., methyl carboxyl groups, $-CH_2COOH$) are formed on the material; holding the material acidified under non-hydrolyzing conditions to bring about the formation of methyl ester bonds whereby constituent macromolecules of the material become bridged (cross-linked) one to another; and thereafter treating the acidified material with alkali to neutralize acid carboxymethyl groups remaining unreacted in the material.

By these treatments the normal carboxymethyl ethers are converted into chemically modified products containing cross-linked macromolecules of the polysaccharide which appear to be linked together through bridging methyl ester bonds. These products are considered to be distinctly new polysaccharide derivatives. Upon being separated from the reaction medium, they show the unique property of being self-gelling in water, in that they will swell strongly and become gelatinous of their own accord, even in cold water and without requiring stirring, immediately upon being added to water or having water added to them. In contrast to the normal carboxymethyl ethers, they do not dissolve in either water or a 60% solution of chloral-hydrate in water. The presence of ester groups in their structure is clearly manifested by the appearance in their infrared spectra of an absorption peak (at approximately 1750 cm.$^{-1}$ in the case of certain amylose derivatives and certain starch derivatives) that does not occur in the infra spectra of the corresponding normal carboxymethyl ethers.

The gels formed by products according to the invention have a smooth creamy or salve-like consistency with distinct shortness or non-cohesiveness, whereby they are easily spreadable or stirrable and yet will hold given shapes without flowing or settling under gravity forces. The viscosity of aqueous dispersions of the products is many times greater than that of similarly concentrated dispersions of either the finely divided polysaccharides per se or the corresponding normal carboxymethyl ethers.

Further, it has been discovered that when the reaction material is very strongly acidified, as to a pH in the range of 0 to 2, then is held for a suitable reaction period in strongly acid condition and then is brought to a pH of about 4 to 7 by the alkali treatment, the product obtained not only possesses the described self-gelling property but will form in water and other aqueous liquids, at a concentration of as little as 1 to 2% therein, a stable gel that does not lose its body or thickness over indefinitely long periods of aging, stirring or exposure to atmospheric conditions. This gel, moreover, shows little sensitivity to variations of pH within the range from approximately neutral through mildly acid conditions.

Accordingly, the new products are useful as bodying, gelling, emulsifying, suspending or thickening agents for wide varieties of aqueous liquids or of mixtures containing such liquids. They are especially valuable for the preparation of food compositions, such, for example, as mayonnaise, fruit jellies or marmalades, ice creams, puddings comminuted meat products, and many others.

The method according to the invention can be carried out by preparing the normal ether in known manner and subjecting it to the treatments with acid and alkali while it remains suspended in the carboxymethylating reaction medium. Of course, the normal ether can also be separated or obtained otherwise in finely divided form and suspended in a suitable organic liquid medium before these treatments. The organic liquid medium most advantageously is methanol, but other water-miscible organic liquids that do not dissolve the reaction material can be used, such, for example, as acetone, ethanol or isopropanol.

The cross-linking reaction is brought about efficiently by the use of a strong mineral acid such as hydrochloric, sulfuric or nitric acid. Hydrochloric acid is preferred. The acid preferably is added to the suspension of the reaction material in the form of a strong aqueous solution, since the time required for the reaction is inversely related to the acid concentration.

The reaction time is also related inversely to the temperature of the reaction medium. Depending upon the conditions selected, it can range from as little as a few minutes to a period of hours. At room temperature and a pH of 0 to 2, a holding period of 25–90 minutes suffices for the preparation of strongly self-gelling products that form stable gels in water.

The neutralization of the acid-treated material can be effected by adding an aqueous solution of alkali to the acid reaction medium or by first separating the material from that medium, then re-suspending it in a suitable liquid medium and then treating it with an alkali solution. The liquid medium used is methanol or some other water-miscible organic liquid of the nature above mentioned. A strong alkali solution, for example, one of 30% to 50% concentration, preferably is used, as the amount of methanol consumed can thus be reduced. The alkali preferably is sodium hydroxide, although potassium hydroxide or other alkali hydroxides may be used.

The alkali preferably is added in an amount bringing the liquid medium to a pH of about 7 to 8, so as to neutralize substantially all of the acid carboxymethyl groups remaining in the material after the cross-linking reaction. The neutralization, however, need not be complete in all practices of the invention, for a product containing a limited concentration of acid groups will still have the described gelling property. For example, an increase of the pH of the liquid medium from 0 to 4, or from 1 to 5, will give a product that possesses and retains this property sufficiently for some purposes.

After the treatment with alkali the product is separated from the liquid medium, as by filtration, washed with methanol or other water-miscible volatile organic solvent, and dried. The dried product is easily disintegratable into a fine powdery form.

The reactions which take place according to the invention may be represented schematically as follows, the symbol $R_{ps}$ here indicating a macromolecule or nucleus of starch, amylose, amylopectin or a like polysaccharide carrying hydroxyl groups:

I. ACIDIFICATION $R_{ps}-O-CH_2COONa$ + acid ⟶ $R_{ps}-O-CH_2COOH$
Na-carboxymethyl ether          Acid carboxymethyl ether

II. ESTERIFICATION (i) $R_{ps}-O-CH_2COOH$ ⟶ remains to stage III (ii)
$R_{ps}-O-CH_2COOH + CH_3OH$ ⟶
Methanol
$R_{ps}-O-CH_2COOCH_3 + H_2O$
Methyl ester (III)
$R_{ps}-O-CH_2COOH + R_{ps}-OH$ with acid catalyst ⟶
$R_{ps}-O-CH_2COO-R_{ps} + H_2O$
Methyl ester bridge

III. NEUTRALIZATION (i)
$R_{ps}-O-CH_2COOH + NaOH$ ⟶ $R_{ps}-O-CH_2COONa$

The following detailed examples further illustrate the practice of the invention:

Example 1

100 g. of starch, 60 ml. of sodium hydroxide solution (33%) and 300 ml. of methanol (95%) are stirred at 65° C. for 15 minutes. After this period 50 g. of sodium-monochloroacetate is added. Then the mixture is stirred at 60 to 70° C. for two hours, whereupon the reaction material is filtered and washed with methanol. The known sodium-carboxymethyl starch is obtained.

Then a mixture of approximately 75 g. of hydrochloric acid (25%) and 300 ml. of methanol (85%) is added to the material and the whole is stirred at room temperature for one hour. Then 500 ml. of methanol (80%) is added and NaOH (33%) is added until the reaction medium is neutral. The resulting preparation is filtered, washed with methanol (80%), again filtered, washed with methanol (100%) and dried. The resulting preparation is a finely divided carboxymethyl starch derivative that immediately forms a gel with water.

Example 2

In known manner a carboxymethyl starch (CMZ) is prepared with a D.S. (degree of substitution) of 0.28 and a viscosity in a 2% solution of 200 cps., measured on an Epprecht-apparatus. A value of approximately 1 second was found by means of the falling weight test. The falling weight test is not very well suited for such low viscosities; it is an indication, however, of the increase in rigidity resulting from the treatment according to the invention.

100 g. of this CMZ was mixed with 800 ml. of methanol (84%) and then with 83 ml. of HCl (25%). This mixture was stirred at room temperature (22° C.) for 1 hour, after which it was filtered and the residue was suspended in 300 ml. of methanol (84%). After 10 minutes it was filtered off and washing with 84% methanol was repeated.

A sample of the suspended material was titrated with 0.1 N NaOH. From this it was calculated how much NaOH (45%) was required to neutralize the whole preparation; the result was 12 ml. of 45% NaOH.

This amount of NaOH was added to the acid-treated material suspended in 500 ml. of methanol (85%). The whole was stirred for 1 hour and then filtered. 100 ml. of 100% methanol was added to the residue for purposes of dehydration and drying.

When 2 g. of this modified CMZ is brought into 100 ml. of water, a gel is formed without stirring. The gel showed a falling time of approximately 26,000 seconds in the falling weight test.

Example 3

The same procedure as in Example 2 was repeated with the difference that in this case 52 ml. of HCl (25%) and 8 ml. of NaOH (45%) were used. The CMZ had a D.S. of 0.35 and such a viscosity that the falling weight test resulted in approximately 1 second falling time. After being treated in the manner described, the material at a concentration of 2% in water formed a gel that showed a falling weight time of approximately 22,000 seconds.

Example 4

The same procedure as in Example 2 was repeated, but this time 26 ml. of 96% $H_2SO_4$ and 7 ml. of 45% NaOH were used. The CMZ was identical to that of Example 3. After being treated in the manner described, the material at a concentration of 2% in water formed a gel that showed a falling weight time of approximately 16,000 seconds.

Example 5

A carboxymethyl amylose (CMA) having a D.S. of 0.5 and a viscosity of 90 cps. (Epprecht) in a 5% solution was used as the starting material.

A quantity of 100 g. of this CMA was mixed with 800 ml. of methanol (84%) and 40 ml. of HCl (25%). The whole was stirred at room temperature (23° C.) for 1 hour and then filtered. The residue was suspended in 150 ml. of methanol (84%) and 6 ml. of NaOH (33%) was added. Then it was stirred for 10 minutes, filtered, suspended i n60 ml. of methanol, 100%), filtered again after 10 minutes, and then dried. A quantity of 2 g. of this modified CMA in 100 ml. of waetr formed a gel, without stirring, which had a falling weight time of approximately 21,000 seconds.

Example 6

100 g. of starch, 60 ml. of sodium hydroxide solution (33%) and 300 ml. of methanol (95%) were stirred at 65° for 15 minutes. After this period, 50 g. of sodium-monochloroacetate was added and the mixture was stirred for two hours at 60 to 70° C. The reaction material was then filtered and then washed with methanol. The known sodium-carboxymethyl starch was obtained.

Subsequently, so much hydrochloric acid (25%) was added to this CMZ in 300 ml. of methanol (85%) that the pH of the medium decreased to 6.0, and the whole was stirred at room temperature for 5 hours. At the end of the reaction period 500 ml. of methanol (80%) was added and NaOH (33%) was added until the medium had a neutral reaction. The resulting preparation was filtered, washed with methanol (80%), again filtered, washed with methanol (100%), and dried. The resulting preparation immediately forms a gel with water.

While numerous details, examples and explanations have been set forth hereinabove to illustrate the practice and principles of the invention, it will be understood that the invention can be applied in various ways, to various materials, and for various purposes. It is not intended to be restricted to particulars of the foregoing description except as may be required by a fair construction of the appended claims.

What is claimed is:

1. A method of preparing a gel-forming derivative of a polysaccharide selected from the group consisting of starch, amylose and amylopectin, which comprises linking together macromolecules of the polysaccharide by esterifying respective carboxyl and hydroxyl groups of such molecules through methyl ester bonds.

2. A method of preparing a gel-forming derivative of a polysaccharide selected from the group consisting of starch, amylose and amylopectin, which comprises acidifying a finely divided carboxymethyl ether of the polysaccharide in a water-miscible organic liquid medium, holding the material acidified therein until acid carboxymethyl groups in the material form ester bonds to link together macromolecules of the polysaccharide, and thereafter neutralizing acid carboxymethyl groups remaining in the material.

3. A method according to claim 2, said ether being a Na-carboxymethyl ether of the polysaccharide.

4. A method according to claim 2, the acidification being effected by the addition of an aqueous solution of a strong mineral acid to the organic liquid medium.

5. A method according to claim 4, the acid being hydrochloric acid.

6. A method according to claim 2, the liquid medium comprising a methylating organic liquid.

7. A method according to claim 2, the liquid medium being methanol.

8. A method according to claim 2, the liquid medium being brought to a pH of 0 to 2 by the acidification and to a pH of 4 to 8 by the neutralization.

9. A method according to claim 2, the liquid medium being brought to a pH of 0 to 1 by the acidification and to a pH of about 7 by the neutralization.

10. A method according to claim 2, the material being held acidified in the liquid medium for a period of from a few minutes to a few hours, depending upon the acid concentration and the temperature of the medium.

11. A method according to claim 2, the material being held in the liquid medium at a pH of 0 to 2 for a period of 25-90 minutes at room temperature.

12. A method according to claim 2, the neutralization being effected by the addition of alkali hydroxide to a suspension of the acidified material in a water-miscible organic liquid medium.

13. A method according to claim 12, and after the neutralization separating the product from the liquid medium, washing it with a low-boiling water-miscible organic solvent, and then drying it.

14. A method according to claim 2, the material being separated from the acidified liquid medium and re-suspended in a water-miscible organic liquid medium for the neutralizaiton.

15. A method according to claim 2, the starting suspension being a suspension of the carboxymethyl ether in the carboxymethylating medium in which the ether was prepared.

16. A method of preparing a starch derivative that is self-gelling in water, which comprises acidifying a finely divided Na-carboxymethyl starch suspended in a methanol medium to a pH of 0 to 2 with an aqeous solution of mineral acid, holding the suspension at said pH under non-hydrolyzing conditions until acid carboxymethyl groups in the material form ester bonds to link together macromolecules of the starch, thereafter treating the acidified material in suspension in water-miscible organic liquid with an aqueous solution of alkali hydroxide in an amount sufficient to bring the suspension to a pH of 4 to 8, and then isolating the product.

17. A method of preparing an amylose derivative that is self-gelling in water, which comprises acidifying a finely divided Na-carboxymethyl amylose suspended in a methanol medium to a pH of 0 to 2 with an aqueous solution of mineral acid, holding the suspension at said pH under non-hydrolyzing conditions until acid carboxymethyl groups in the material form ester bonds to link together macromolecules of the amylose, thereafter treating the acidified material in suspension in water-miscible organic liquid with an aqueous solution of alkali hydroxide in an amount sufficient to bring the suspension to a pH of 4 to 8, and then isolating the product.

18. A gel-forming derivative of a polysaccharide selected from the group consisting of starch, amylose and amylopectin, comprising a finely divided carboxymethyl ether of the polysaccharide containing macromolecules thereof linked together through methyl ester bonds prepared by a method according to claim 2.

19. A gel-forming derivative of starch, comprising a finely divided carboxymethyl starch containing starch macromolecules linked together through methyl ester bonds prepared by a method according to claim 16.

20. A gel-forming derivative of amylose, comprising a finely divided carboxymethyl amylose containing amylose macromolecules linked together through methyl ester bonds prepared by a method according to claim 17.

References Cited

UNITED STATES PATENTS

| | | | |
|---|---|---|---|
| 2,698,322 | 12/1954 | Leaf | 260—232 |
| 3,238,193 | 3/1966 | Tuschhoff | 260—233.5 |

DONALD E. CZAJA, *Primary Examiner.*

LEON J. BERCOVITZ, *Examiner.*

R. W. MULCAHY, *Assistant Examiner.*